United States Patent
Yu et al.

(10) Patent No.: US 10,225,778 B2
(45) Date of Patent: Mar. 5, 2019

(54) METHOD, APPARATUS, AND SYSTEM FOR SELECTING PUBLIC LAND MOBILE NETWORK

(71) Applicant: Huawei Technologies Co., Ltd., Shenzhen (CN)

(72) Inventors: Yijun Yu, Shanghai (CN); Feng Lu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 391 days.

(21) Appl. No.: 13/709,704

(22) Filed: Dec. 10, 2012

(65) Prior Publication Data
US 2013/0100932 A1    Apr. 25, 2013

Related U.S. Application Data

(63) Continuation of application No. PCT/CN2010/073767, filed on Jun. 10, 2010.

(51) Int. Cl.
*H04W 36/16* (2009.01)
*H04W 48/18* (2009.01)
*H04W 36/00* (2009.01)

(52) U.S. Cl.
CPC ..... *H04W 36/165* (2013.01); *H04W 36/0066* (2013.01); *H04W 48/18* (2013.01); *H04W 36/0022* (2013.01); *H04W 36/0033* (2013.01)

(58) Field of Classification Search
None
See application file for complete search history.

(56) References Cited

U.S. PATENT DOCUMENTS

| 2008/0039082 | A1 | 2/2008 | Kim | |
| 2010/0098023 | A1* | 4/2010 | Aghili et al. | 370/331 |
| 2010/0261473 | A1* | 10/2010 | Al-Bakri et al. | 455/435.2 |
| 2010/0302937 | A1 | 12/2010 | Hu et al. | |
| 2011/0151878 | A1* | 6/2011 | Xu | H04W 48/10 455/444 |
| 2011/0280217 | A1* | 11/2011 | Drevon | H04W 48/18 370/331 |

FOREIGN PATENT DOCUMENTS

| CN | 101222765 A | 7/2008 |
| CN | 101483823 A | 7/2009 |

(Continued)

OTHER PUBLICATIONS

3$^{rd}$ Generation Partnership Project; Technical Specificatoin Group Radio Access Network; Evolved Universal Terrestrial Radio Access Network (E-UTRAN); S1 Application Protocol (S1AP) (Release 9), 3GPP TS 36.413 V9.2.2, Apr. 2010, 244 pages.

(Continued)

*Primary Examiner* — Kevin C. Harper
*Assistant Examiner* — Derrick V Rose
(74) *Attorney, Agent, or Firm* — Slater Matsil, LLP

(57) ABSTRACT

The embodiments of the present invention relate to a method, an apparatus, and a system for selecting a public land mobile network. In an embodiment method an eNodeB acquires PLMN information about a CSFB. The eNodeB then determines a target cell of a packet switching handover according to the PLMN information about the CSFB.

18 Claims, 4 Drawing Sheets

(56) References Cited

FOREIGN PATENT DOCUMENTS

| CN | 101500278 A | 8/2009 |
|---|---|---|
| WO | WO 2010/051873 A1 | 5/2010 |

OTHER PUBLICATIONS

3rd Generation Partnership Project; Technical Specification Group Service and System Aspects; Network Sharing; Architecture and functional description (Release 9), 3GPP TS 23.251 V9.2.0, Mar. 2010, 20 pages.

3rd Generation Partnership Project; Technical Specification Group Services and System Aspects; circuit Switched (CS) fallback in Evolved Packet System (EPS); Stage 2 (Release 9), 3GPP TS 23.272 V9.3.0, Mar. 2010, 66 pages.

Qualcomm Incorporated, "Clarification on PLMN selection for CSFB when UTRAN/GERAN support network sharing," 3GPP TSG SA WG2 Meeting #79, S2-103063, Kyoto, Japan, May 10-14, 2010, 10 pages.

Qualcomm Incorporated, "Clarification on PLMN selection for CSFB when UTRAN/GERAN support network sharing," 3GPP TSG SA WG2 Meeting #78E, S2-101984, Elbonia, Apr. 12-15, 2010, 11 pages.

Chinese Search Report of Chinese Application No. 201080001616.0, dated May 14, 2012, 7 pages. (Partial Translation).

First Chinese Office Action of Chinese Application No. 201080001616.0, dated Jul. 23, 2012, 11 pages.

Second Office Action of Chinese Application No. 201080001616.0, dated Dec. 24, 2012, 12 pages.

International Search Report received in International Application No. PCT/CN2010/073767, Applicant: Huawei Technologies Co., Ltd. et al., dated Oct. 28, 2010, 4 pages.

Written Opinion of the International Searching Authority received in International Application No. PCT/CN2010/073767, Applicant: Huawei Technologies Co., Ltd. et al., dated Oct. 28, 2010, 4 pages.

Rejection Decision of Chinese Application No. 201080001616.0 dated May 2, 2013, 15 pages. (Partial Translation).

"3rd Generation Partnership Project; Technical Specification Group Services and System Aspects; General Packet Radio Service (GPRS) enhancements for Evolved niversal Terrestrial Radio Access Network (E-UTRAN) access (Release 9)," 3GPP TS 23.401 V9.4.0 Mar. 2010, 258 pages.

Huawei et al., "Minimising additional call delay even with Location Updates during CS Fall Back," 3GPP TSG SA WG2 MEeting #78, TD S2-101063, Feb. 22-26, 2010.

Huawei et al., "Network sharing impact on the CSFB," 3GPP TSG SA WG2 Meeting #92, S2-122769, Barcelona, Spain, Jul. 9-13, 2012, 21 pages.

Huawei et al., "Multiple PLMNs Selection in eNodeB for CS fallback," 3GPP TSG-RAN3 Meeting #70, R3-103258, Jacksonville, USA, Nov. 15-19, 2010, 102 pages.

* cited by examiner

METHOD, APPARATUS, AND SYSTEM FOR SELECTING PUBLIC LAND MOBILE NETWORK

This application is a continuation of International Application No. PCT/CN2010/073767, filed on Jun. 10, 2010, which is hereby incorporated by reference in its entirety.

TECHNICAL FIELD

The present invention relates to the field of mobile communications technologies, and in particular, to a method, an apparatus, and a system for selecting a public land mobile network (Public Land Mobile Network, PLMN for short).

BACKGROUND

An evolved universal mobile telecommunication system territorial radio access network (Evolved Universal Mobile Telecommunication System Territorial Radio Access Network, E-UTRAN for short) and an evolved packet core network (Evolved Packet Core Network, EPC for short) form an evolved packet system (Evolved Packet System, EPS for short). Many services of operators are run in the 2G/3G circuit switching (Circuit Switching, CS for short) domain. To reuse the existing CS domain services in an EPS network, it is proposed to connect to the CS domain core network through the EPS network so that a user equipment (User Equipment, UE for short) is able to initiate and receive CS services in the EPS network and return to the 2G/3G network through the E-UTRAN to perform the CS services. The network architecture and processing method may be called circuit switching fallback (CS Fallback, CSFB for short).

During the execution of the CSFB procedure, the UE executes the combined attach or combined tracking area update procedure in the E-UTRAN to register with the mobile switching center/visitor location register (Mobile Switching Center/Visitor Location Register, MSC/VLR for short) of CS core network devices from the EPS network. In the process, a mobility management entity (Mobility Management Entity, MME for short) selects a proper MSC/VLR. At this time, according to commercial settings of the operator, the MME may select an MSC/VLR that has a public land mobile network identity (PLMN ID) different from that of the EPS network to which the UE is attached. Next, the UE executes the CSFB process to fall back to the 2G/3G network and access the PLMN where the MSC/VLR is located, thereby completing subsequent CS domain services.

One method for executing the CSFB process to fall back to the 2G/3G is as follows: An evolved base station (Evolved NodeB, eNodeB for short) executes a packet switching handover (PS Handover, PS HO for short) procedure to select a proper target 2G/3G cell for the UE to complete CSFB processing, where the cell is marked with a cell identity (Cell ID), and the cell ID includes information about the PLMN to which the cell belongs, that is, the Cell ID includes the PLMN ID. However, the eNodeB is not able to perceive the PLMN ID of the MSC/VLR selected by the MME in the combined attach or combined tracking area update procedure. At this time, the PLMN ID of the target cell selected by the eNodeB may be different from the PLMN ID of the MSC/VLR selected by the MME so that the handover target 2G/3G cell selected for the UE by the eNodeB may belong to other PLMNs. In this case, when the UE camps to the target 2G/3G cell, as the PLMN is changed, the cell is served by another MSC/VLR. As a result, the UE needs to register with the new MSC/VLR by executing the location area update (Location Area Update, LAU for short) procedure before performing the CS service. In the case of being a called party/call termination, a roaming retry (Roaming Retry) procedure further needs to be executed for this new MSC/VLR and the MSC/VLR previously registered by the UE to complete the called procedure. The additional location area update and roaming retry procedures increase the processing delay of the CSFB procedure, and reduces the service success rate and user experience.

SUMMARY OF THE INVENTION

The embodiments of the present invention provide a method, an apparatus, and a system for selecting a public land mobile network (Public Land Mobile Network, PLMN for short) to avoid an additional processing delay of the CSFB procedure caused when an eNodeB selects a different PLMN for failing to perceive the PLMN where the MSC/VLR attached in the EPS network by the UE in the CSFB procedure, and improve the service success rate.

An embodiment of the present invention provides a method for selecting a public land mobile network. An eNodeB acquires PLMN information about a CSFB and determines a target cell of a packet switching handover according to the PLMN information about the CSFB.

An embodiment of the present invention further provides an evolved base station. An acquisition module is configured to acquire PLMN information about a CSFB. A determination module is configured to determine a target cell of a packet switching handover according to the PLMN information about the CSFB.

An embodiment of the present invention further provides a mobility management network element, including a providing module that is configured to provide PLMN information about a CSFB to an eNodeB so that the eNodeB determines a target cell of a packet switching handover.

An embodiment of the present invention still further provides a system for selecting a public land mobile network, including a mobility management network element, configured to provide PLMN information about a CSFB, and an evolved base station, configured to acquire PLMN information about the CSFB and determine a target cell of a packet switching handover according to the PLMN information about the CSFB.

It may be known from the technical solutions that in the embodiments of the present invention, an eNodeB acquires PLMN information about a CSFB, so that the eNodeB determines a target cell of a packet switching handover according to the acquired PLMN information about the CSFB, and switches to the PLMN where the MSC/VLR attached by the UE in the EPS network is located, thereby avoiding an additional processing delay of the CSFB procedure caused when an eNodeB selects a different PLMN for failing to perceive the PLMN where the MSC/VLR attached by the UE in the EPS network is located in the CSFB procedure, and improving the service success rate.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
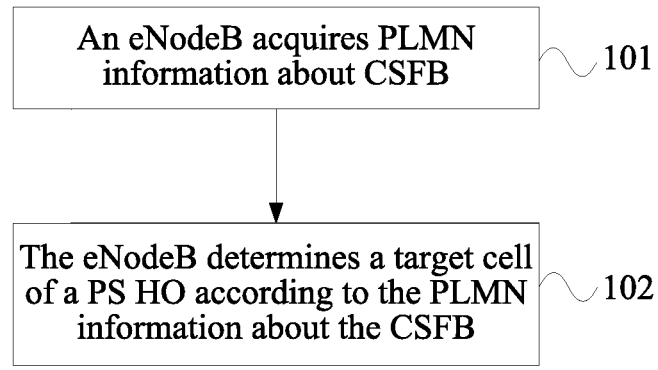
FIG. 1 is a flow chart of a method for selecting a public land mobile network according to Embodiment 1 of the present invention.

FIG. 1 is a flow chart of a method for selecting a public land mobile network according to Embodiment 1 of the present invention. As shown in FIG. 1, the method for selecting the public land mobile network according to this embodiment may include the following steps.

Step 101: An eNodeB acquires PLMN information about a CSFB.

Step 102: The eNodeB determines a target cell of a PS HO according to the PLMN information about the CSFB.

In this embodiment, the eNodeB acquires the PLMN information about the CSFB, so that the eNodeB determines the target cell of the packet switching handover according to the acquired PLMN information about the CSFB, and switches to the PLMN where the MSC/VLR attached in the EPS network by the UE is located, thereby avoiding an additional processing delay of the CSFB procedure caused when an eNodeB selects a different PLMN for failing to perceive the PLMN where the MSC/VLR attached by the UE in the EPS network is located in the CSFB procedure, and improving the service success rate.

Figure 2:
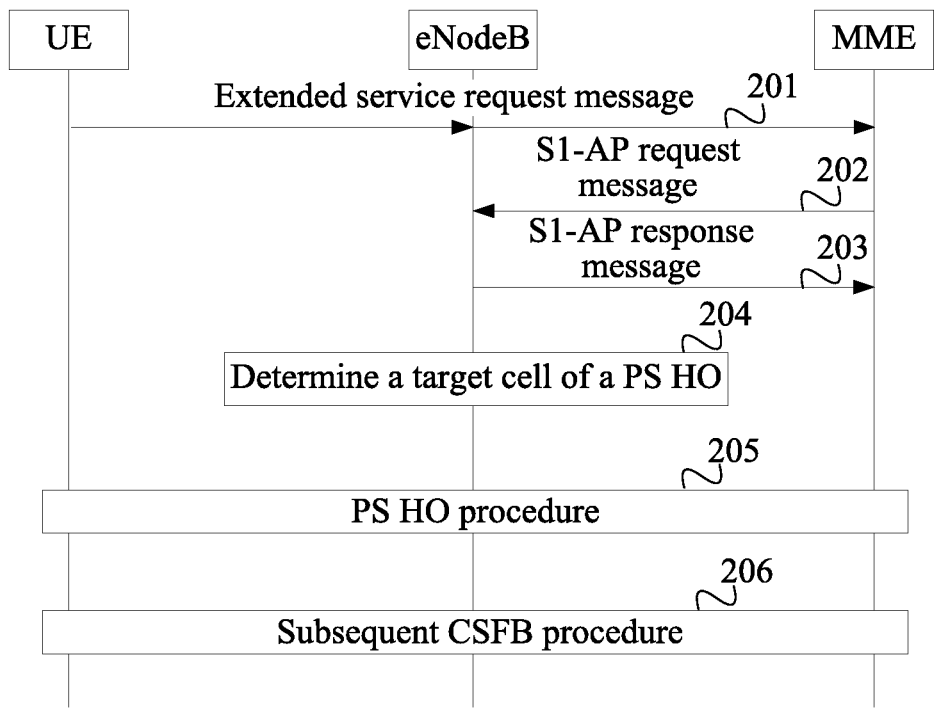
FIG. 2 is a flow chart of a method for selecting a public land mobile network according to Embodiment 2 of the present invention.

FIG. 2 is a flow chart of a method for selecting a public land mobile network according to Embodiment 2 of the present invention. This embodiment is applicable to the scenario where a UE initiates a CSFB call (that is, CSFB calling) in an EPS network. As shown in FIG. 2, the method for selecting the public land mobile network according to this embodiment may include the following steps.

Step 201: The UE sends an extended service request (Extended Service Request) message to an MME, where the message includes a CSFB indication indicating that the UE intends to execute a CSFB.

Step 202: The MME sends an S1 interface application protocol (S1-AP) request message to an eNodeB, where the message includes PLMN information about the CSFB selected in the CSFB procedure.

The PLMN information about the CSFB in the CSFB procedure refers to the information about the PLMN to which the MSC/VLR selected for the UE by the MME belongs, for example, the PLMN identity (PLMN ID) of the PLMN to which the MSC/VLR belongs. The S1-AP request message sent by the MME to the eNodeB includes the PLMN information about the CSFB. The specific implementation may include, but is not limited to, the following modes.

A. The PLMN information about the CSFB is an independent parameter in the S1-AP request message, which may exist separately, or may also be a part of an existing parameter in the S1-AP request message, for example, may be included in a handover restriction list (Handover Restriction List) parameter.

B. The PLMN information about the CSFB is indirectly provided to the eNodeB through other parameters. For example, the MME may include a location area identity (LAI) parameter in the S1-AP request message to reflect the PLMN information. The PLMN ID included in the LAI parameter is the PLMN ID of the CS selected by the MME. The LAI parameter may also be included in a handover restriction list (Handover Restriction List) parameter of the S1-AP request message.

C. The PLMN information about the CSFB may be included in an equivalent PLMN (Equivalent PLMN, E-PLMN for short) list. For example, the PLMN information about the CSFB selected by the MME is placed as the first in the equivalent PLMN list, and the eNodeB first chooses to use this PLMN, thereby ensuring that the eNodeB is able to select this PLMN as the target network subsequently. An independent indication (for example, selected PLMN for CS) may also be used in the S1-AP request message to indicate that the PLMN information about the CSFB is included in the equivalent PLMN list, or indicate which PLMN in the E-PLMN list is the PLMN of the CS.

In this step, the S1-AP request message may specifically be an initial context setup request (INITIAL CONTEXT SETUP REQUEST) message, or may also be a UE context modification request (UE CONTEXT MODIFICATION REQUEST) message.

Step 203: The eNodeB sends an S1-AP response message to the MME.

Step 204: The eNodeB determines a target cell of a PS HO according to the PLMN information about the CSFB. That is, the eNodeB selects the PLMN corresponding to the PLMN information about the CSFB as the target PLMN of the PS HO, so as to select a target cell in the corresponding target PLMN.

In this step, the eNodeB may determine the target cell of the packet switching handover according to the PLMN information about the CSFB in the following ways.

The eNodeB may select an RNC in the PLMN corresponding to the PLMN information about the CSFB as the target of the packet switching handover.

Alternatively, the eNodeB may select a cell in the PLMN corresponding to the PLMN information about the CSFB as the target cell of the packet switching handover.

In this step, when a target network of the handover is a 3G or UTRAN, the eNodeB includes the PLMN information about the CSFB in a target RNC (radio network controller) identity (Target RNC ID), and specifically, includes the PLMN ID in a LAI parameter of the target RNC ID; when the target network of the handover is a 2G or GSM EDGE Radio Access Network (GERAN, where GSM stands for Global System for Mobile Communications, originally Groupe Special Mobile and EDGE stands for Enhanced Data rates for GSM Evolution), the eNodeB includes the PLMN information about the CSFB in a target cell global identification (CGI), and specifically, includes the PLMN ID in a PLMN ID parameter of the target CGI.

Step 203 and step 204 are not subject to an execution sequence.

Step 205: The eNodeB executes the PS HO procedure to migrate the UE to the 2G/3G network.

Step 206: The UE completes the subsequent CSFB procedure after being switched to the target cell, which is not described herein again.

In this embodiment, the eNodeB selects the PLMN corresponding to the PLMN information about the CSFB for the CS domain service as the target PLMN of the PS HO, so that the UE migrates to the 2G/3G network in the target PLMN, the triggering of execution of the LAU procedure may be avoided, the processing delay of the CSFB procedure is reduced, and the service success rate is improved.

Figure 3:
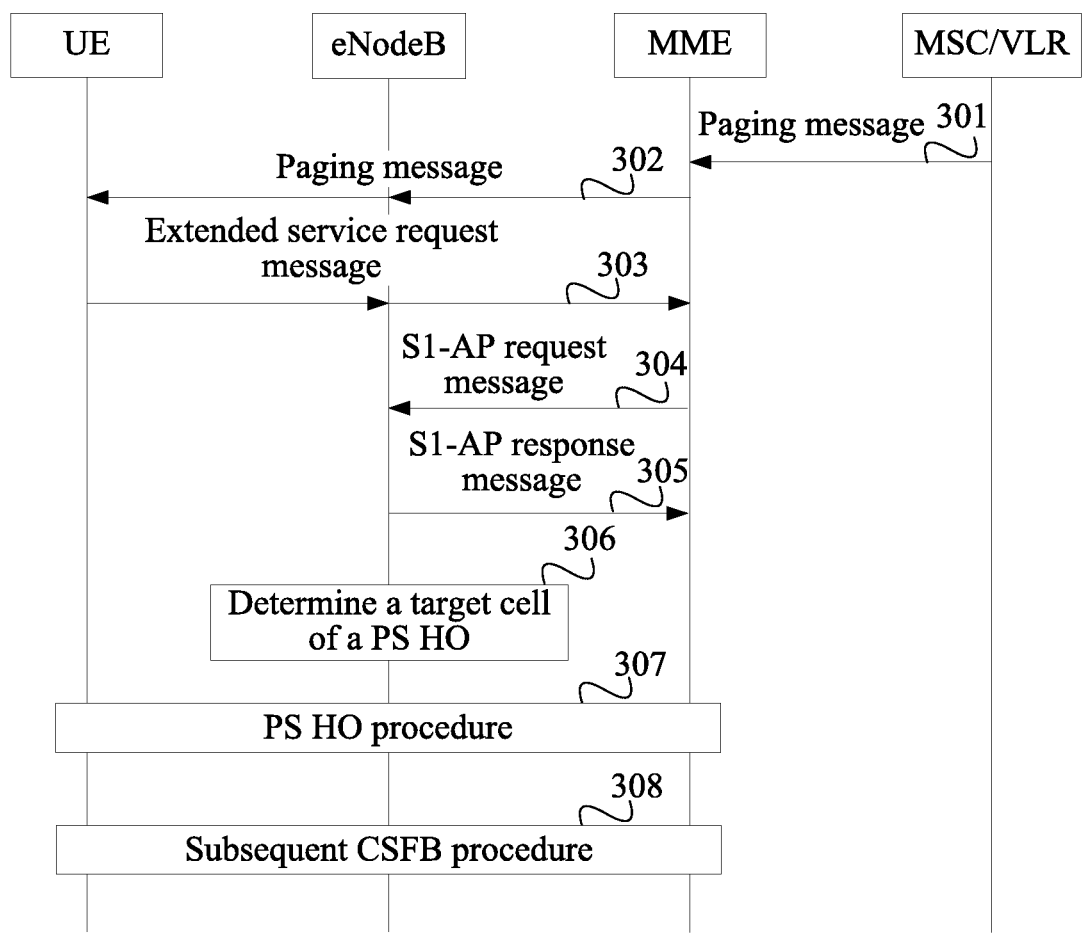
FIG. 3 is a flow chart of a method for selecting a public land mobile network according to Embodiment 3 of the present invention.

FIG. 3 is a flow chart of a method for selecting a public land mobile network according to Embodiment 2 of the present invention. This embodiment is applicable to the scenario where a UE receives a CSFB call (that is, CSFB called or CSFB call termination) in an EPS network. As shown in FIG. 3, the method for selecting the public land mobile network according to this embodiment may include the following steps.

Step 301: The MSC/VLR receives voice call signaling and sends a paging message to the MME.

Step 302: The MME sends the paging message to the UE.

Step 303: The UE sends an extended service request (Extended Service Request) message to an MME, where the message includes a CSFB indication indicating that the UE intends to execute a CSFB.

Step 304: The MME sends an S1 interface application protocol (S1-AP) request message to an eNodeB, where the message includes PLMN information about the CSFB selected in the CSFB procedure.

The PLMN information about the CSFB in the CSFB procedure refers to the information about the PLMN to which the MSC/VLR selected for the UE by the MME belongs, for example, PLMN identity (PLMN ID) of the PLMN to which the MSC/VLR belongs. The specific implementation methods for including the PLMN information about the CSFB in the S1-AP request message sent by the MME to the eNodeB may be referred to the relevant content in step 202 in the previous embodiment, and are not described herein again.

In this step, the S1-AP request message may specifically be an initial context setup request (INITIAL CONTEXT SETUP REQUEST) message, or may also be a UE context modification request (UE CONTEXT MODIFICATION REQUEST) message.

Step 305: The eNodeB sends an S1-AP response message to the MME.

Step 306: The eNodeB determines a target cell of a PS HO according to the PLMN information about the CSFB, that is, the eNodeB selects the PLMN corresponding to the PLMN information about the CSFB as the target PLMN of the PS HO, and thereby selects a target cell in the corresponding target PLMN.

The specific implementation may be referred to the relevant content in step 204 in the previous embodiment, and is not described herein again.

Step 305 and step 306 are not subject to an execution sequence.

Step 307: The eNodeB executes the PS HO procedure to migrate the UE to the 2G/3G network.

Step 308: The UE completes the subsequent CSFB procedure after being switched to the target cell, which is not described herein again.

In this embodiment, the eNodeB selects the PLMN corresponding to the PLMN information about the CSFB for the CS domain service as the target PLMN of the PS HO, so that the UE migrates to the 2G/3G network in the target PLMN, the triggering of execution of the LAU procedure and the roaming retry procedure may be avoided, the processing delay of the CSFB procedure is reduced, and the service success rate is improved.

Figure 4:
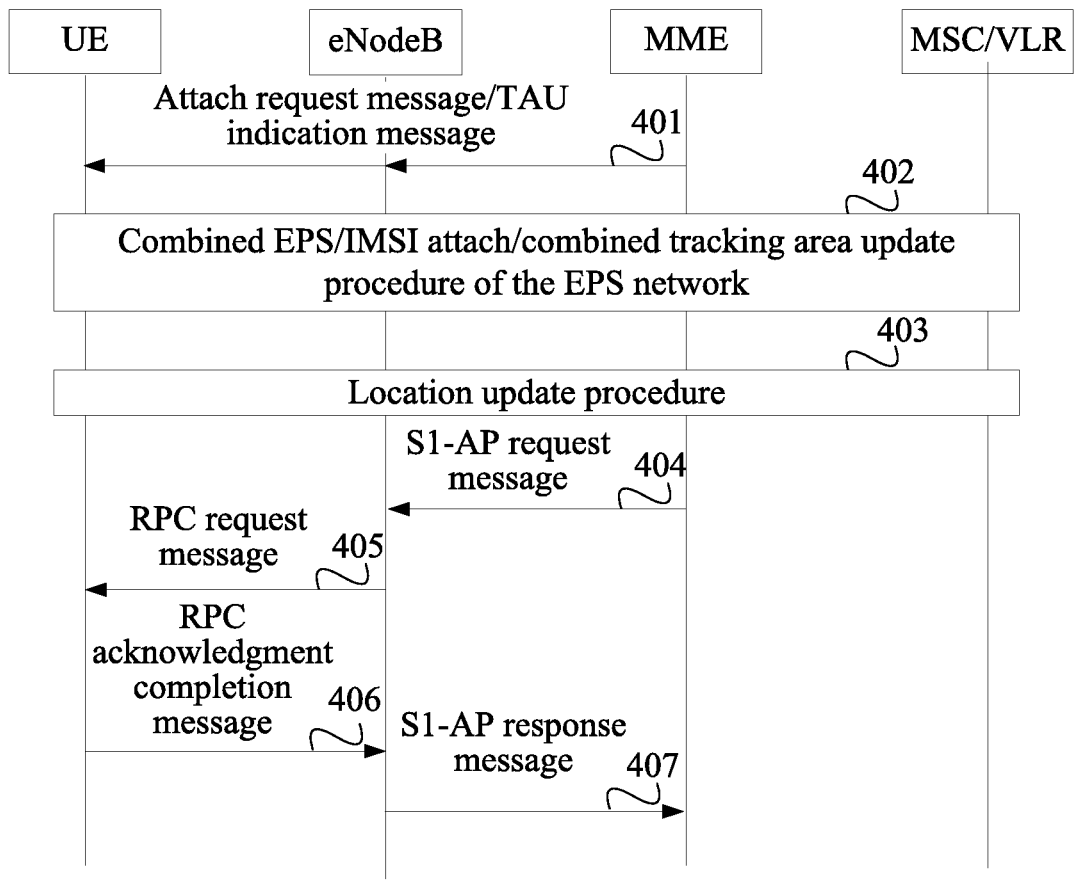
FIG. 4 is a flow chart of a method for selecting a public land mobile network according to Embodiment 4 of the present invention.

FIG. 4 is a flow chart of a method for selecting a public land mobile network according to Embodiment 4 of the present invention. Different from Embodiment 2 of the present invention and Embodiment 3 of the present invention, which are applicable to scenarios where the MME provides the PLMN information about the CSFB to the eNodeB in the call process (including calling and called), this embodiment is applicable to the scenario where, after selecting an MSC/VLR in the combined EPS/IMSI attach/combined tracking area update procedure, the MME provides the PLMN information about the CSFB where the selected MSC/VLR is located to the eNodeB. As shown in FIG. 4, the method for selecting the public land mobile network according to this embodiment may include the following steps.

Step 401: The UE sends an attach request (Attach Request) message/tracking area update request (TAU Request) message to the MME, where the attach type in the attach request message indicates that it is a combined attach request (combined EPS/IMSI attach Request) or the update type in the tracking area update request indicates that it is a combined tracking area/location area update request (Combined Tracking Area/Location Area Update Request), or combined tracking area/location area update with IMSI attach request (combined Tracking Area/Location Area Update with IMSI attach Request).

Step 402: Execute the combined attach/combined tracking area update procedure of the EPS network, for example, a default bearer is established in the attach procedure.

Step 403: The MME executes the location update procedure to the MSC/VLR according to the attach type indication in the attach request message, and the MSC/VLR executes corresponding CS location update processing, for example, registers the UE with the HLR/HSS.

In this step, the MME selects a proper MSC/VLR according to the information such as an operator policy, where, the PLMN (that is, the PLMN for the CS) to which the MSC/VLR selected by the MME belongs may be different from the PLMN to which the MME belongs.

Step 404: The MME sends an S1 interface application protocol (S1-AP) request message to an eNodeB, where the message includes PLMN information about the CSFB selected in the CSFB procedure.

In this step, the S1-AP request message may specifically be an initial context setup request (INITIAL CONTEXT SETUP REQUEST) message, or may also be a downlink non access stratum transport (DOWNLINK NAS TRANSPORT) message. The attach accept (Attach Accept) message/TAU accept (TAU Accept) message sent by the MME to the UE may be encapsulated in the S1-AP request message.

The PLMN information about the CSFB is the information about the PLMN to which the MSC/VLR selected by the MME for the UE in step 403 belongs, for example, the PLMN identity (PLMN ID) of the PLMN to which the MSC/VLR belongs. The specific implementation method for the PLMN information about the CSFB in the S1-AP request message may be referred to the relevant content in step 202 in Embodiment 2 of the present invention, and is not described herein again.

Step 405: The eNodeB sends a radio resource connection (Radio Resource Connection, RRC for short) request message to the UE, where the RRC message may include the attach accept (Attach Accept) message/TAU accept (TAU Accept) message sent by the MME to the UE.

Step 406: The UE sends an RRC acknowledgment completion message to the eNodeB.

Step 407: The eNodeB sends an S1-AP response message to the MME to complete the combined EPS/IMSI attach/combined tracking area update procedure, which is not described herein.

In this embodiment, the MME provides the PLMN information about the CSFB selected for the CS domain service in the combined attach/combined tracking area update procedure to the eNodeB, and during the subsequent execution of the CSFB procedure (for example, CSFB calling or CSFB called), the eNodeB may select the PLMN corresponding to the PLMN information about the CSFB as the target PLMN of the PS HO, so that the UE migrates to the 2G/3G network in the target PLMN, the triggering of execution of the LAU procedure and the roaming retry procedure may be avoided, the processing delay of the CSFB procedure is reduced, and the service success rate is improved.

Figure 5:
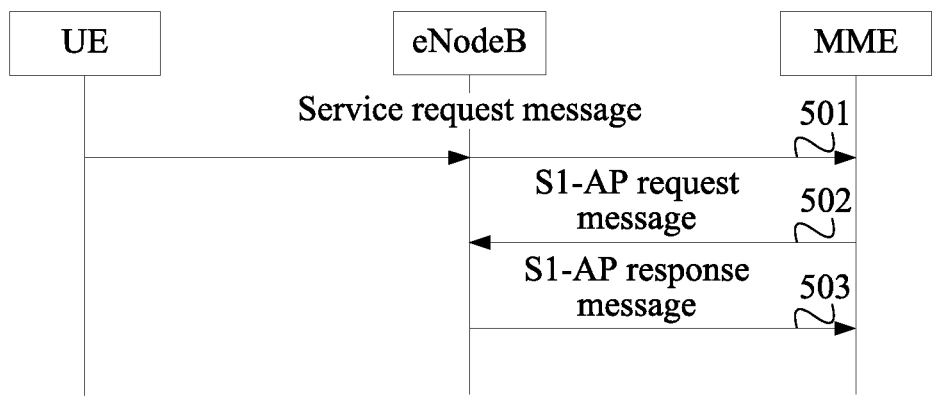
FIG. 5 is a flow chart of a method for selecting a public land mobile network according to Embodiment 5 of the present invention.

FIG. 5 is a flow chart of a method for selecting a public land mobile network according to Embodiment 5 of the present invention. Different from Embodiment 2 of the present invention and Embodiment 3 of the present invention, which are applicable to scenarios where the MME provides the PLMN information about the CSFB to the eNodeB in the call process (including calling and called), this embodiment is applicable to the scenario where, before a call, the MME provides the PLMN information about the CSFB selected in the service request process to the eNodeB. As shown in FIG. 5, the method for selecting the public land mobile network according to this embodiment may include the following steps.

Step 501: The UE sends a service request (Service Request) message to the MME.

Step 502: The MME sends an S1-AP request message to an eNodeB, where the message includes PLMN information about the CSFB selected in the CSFB procedure.

In this step, the S1-AP request message may specifically be an initial context setup request (INITIAL CONTEXT SETUP REQUEST) message.

The PLMN information about the CSFB is the information about the PLMN to which the MSC/VLR selected by the MME for the UE belongs in the combined attach/combined tracking area update procedure, for example, PLMN identity (PLMN ID) of the PLMN to which the MSC/VLR belongs. The specific implementation method for the PLMN information about the CSFB in the S1-AP request message may be referred to the relevant content in step 202 in Embodiment 2 of the present invention, and is not described herein again.

Step 503: The eNodeB sends an S1-AP response message to the MME to complete the service request procedure, which is not described herein.

In this step, the S1-AP response message may specifically be an initial context setup complete (INITIAL CONTEXT SETUP COMPLETE) message.

In this embodiment, the MME provides the PLMN information about the CSFB selected for the CS domain service to the eNodeB, and subsequently the eNodeB may select the PLMN corresponding to the PLMN information about the CSFB as the target PLMN of the PS HO, so that the UE migrates to the 2G/3G network in the target PLMN, the triggering of execution of the LAU procedure and the roaming retry procedure may be avoided, the processing delay of the CSFB procedure is reduced, and the service success rate is improved.

It should be noted that for ease of description, the method embodiments are expressed as a series of action combinations. However, those skilled in the art should know that, the present invention is not limited to the described action sequences because certain steps according to the present invention may be executed in other sequences or at the same time. Secondly, those skilled in the art should know that, all the embodiments described in the specification are exemplary embodiments, and the involved actions or modules are not necessarily essential in the present invention.

In the embodiments, the description of each embodiment has its emphasis. For those parts that are not described in detail in a certain embodiment, refer to the relevant descriptions in other embodiments.

Figure 6:
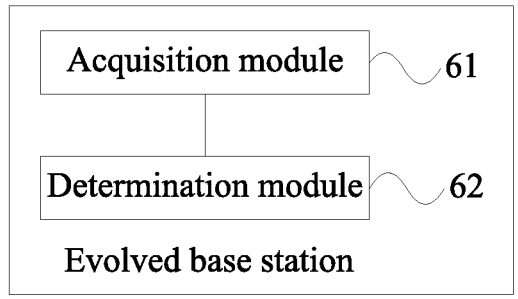
FIG. 6 is a structural schematic diagram of an evolved NodeB according to Embodiment 6 of the present invention.

FIG. 6 is a structural schematic diagram of an evolved base station according to Embodiment 6 of the present invention. As shown in FIG. 6, the evolved base station according to this embodiment may include an acquisition module 61 and a determination module 62. The acquisition module 61 acquires PLMN information about the CSFB, and the determination module 62 determines a target cell of a packet switching handover according to the PLMN information about the CSFB acquired by the acquisition module 61.

The functions of the eNodeB in Embodiment 1 of the present invention, the eNodeB in Embodiment 2 of the present invention, the eNodeB in Embodiment 3 of the present invention, the eNodeB in Embodiment 4 of the present invention, and the eNodeB in Embodiment 5 of the present invention may all be implemented by the evolved base station provided in this embodiment.

In this embodiment, the acquisition module acquires the PLMN information about the CSFB, and the determination module determines the target cell of the packet switching handover according to the acquired PLMN information about the CSFB, so as to switch to the PLMN where the MSC/VLR attached by the UE in the EPS network is located, thereby avoiding an additional processing delay of the CSFB procedure caused when an eNodeB selects a different PLMN for failing to perceive the PLMN where the MSC/VLR attached by the UE in the EPS network is located in the CSFB procedure, and improving the service success rate.

Further, the acquisition module 61 in this embodiment may specifically acquire the PLMN information about the CSFB through the following methods.

A. Receive an S1-AP request message sent by an MME, where the S1-AP request message includes a PLMN identity.

B. Alternatively, receive an S1-AP request message sent by an MME, where the S1-AP request message includes a location area identity, and the location area identity includes a PLMN identity.

C. Alternatively, receive an S1-AP request message sent by an MME, where the S1-AP request message includes an equivalent PLMN list or the equivalent PLMN list and indication information indicating a selected PLMN for the CS.

Furthermore, the determination module 62 in this embodiment may specifically select the PLMN corresponding to the PLMN information about the CSFB as the target PLMN of the packet switching handover, and select a target cell in the corresponding target PLMN, or may further first select the PLMN corresponding to the PLMN information about the CSFB as the target PLMN of the packet switching handover, and select a target cell in the corresponding target PLMN.

Figure 7:
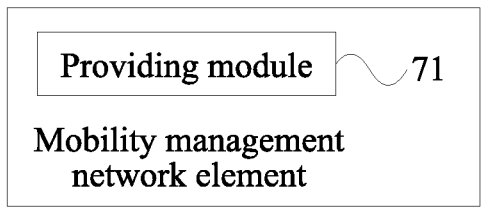
FIG. 7 is a structural schematic diagram of a mobility management network element according to Embodiment 7 of the present invention.

FIG. 7 is a structural schematic diagram of a mobility management network element according to Embodiment 7 of the present invention. As shown in FIG. 7, the mobility management network element in this embodiment may include a providing module 71, configured to provide PLMN information about a CSFB to an eNodeB so that the eNodeB determines a target cell of a packet switching handover.

The functions of the MME in Embodiment 2 of the present invention, the MME in Embodiment 3 of the present invention, the MME in Embodiment 4 of the present invention, and the MME in Embodiment 5 of the present invention may all be implemented by the mobility management network element provided in this embodiment.

In this embodiment, the providing module provides the PLMN information about the CSFB to the eNodeB, and the eNodeB determines the target cell of the packet switching handover according to the acquired PLMN information about the CSFB, so as to switch to the PLMN where the MSC/VLR attached by the UE in the EPS network is located, thereby avoiding an additional processing delay of the CSFB procedure caused when an eNodeB selects a different PLMN for failing to perceive the PLMN where the MSC/VLR attached by the UE in the EPS network is located in the CSFB procedure, and improving the service success rate.

Furthermore, the providing module 71 in this embodiment may specifically provide the PLMN information about the CSFB through the following methods.

A. Send an S1-AP request message to the eNodeB, where the S1-AP request message includes a PLMN identity.

B. Alternatively, send an S1-AP request message sent to the eNodeB, where the S1-AP request message includes a location area identity, and the location area identity includes a PLMN identity.

C. Alternatively, send an S1-AP request message to the eNodeB, where the S1-AP request message includes an equivalent PLMN list or the equivalent PLMN list and indication information that indicates a selected PLMN for the CS.

Figure 8:
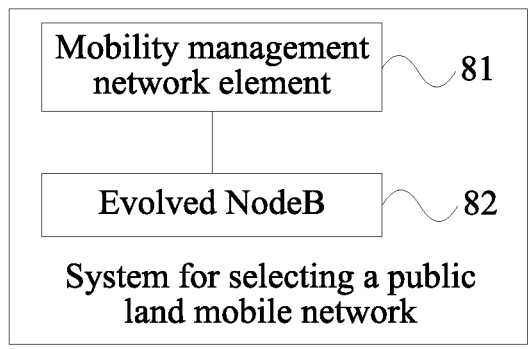
FIG. 8 is a structural schematic diagram of a system for selecting a public land mobile network according to Embodiment 8 of the present invention.

FIG. 8 is a structural schematic diagram of a system for selecting a public land mobile network according to Embodiment 8 of the present invention. As shown in FIG. 8, the system for selecting the public land mobile network may include a mobility management network element 81 and an evolved base station 82.

The mobility management network element 81 is configured to provide PLMN information about a CSFB.

The evolved base station 82 is configured to acquire PLMN information about the CSFB and determine a target cell of a packet switching handover according to the PLMN information about the CSFB.

The functions of the eNodeB in Embodiment 1 of the present invention, the eNodeB in Embodiment 2 of the present invention, the eNodeB in Embodiment 3 of the present invention, the eNodeB in Embodiment 4 of the present invention, and the eNodeB in Embodiment 5 of the present invention may all be implemented by the evolved base station 82 in the system for selecting the public land mobile network provided in this embodiment. The functions of the MME in Embodiment 2 of the present invention, the MME in Embodiment 3 of the present invention, the MME in Embodiment 4 of the present invention, and the MME in Embodiment 5 of the present invention may all be implemented by the mobility management network element 81 in the system for selecting the public land mobile network provided in this embodiment.

In this embodiment, the eNodeB acquires the PLMN information about the CSFB from the MME, and the eNodeB determines the target cell of the packet switching handover according to the acquired PLMN information about the CSFB, so as to be switched to the PLMN where the MSC/VLR attached by the UE in the EPS network is located, thereby avoiding an additional processing delay of the CSFB procedure caused when an eNodeB selects a different PLMN for failing to perceive the PLMN where the MSC/VLR attached by the UE in the EPS network is located in the CSFB procedure, and improving the service success rate.

It needs to be noted that the PLMN information about the CSFB in the embodiments of the present invention may include the following information. For example, the PLMN information might relate to the MSC/VLR selected by the MME during a combined attach process or a combined tracking area update process of the CSFB. Alternatively, or in addition, the PLMN information might relate to a CS domain selected by the MME during the combined attach process or a combined tracking area update process of the CSFB.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method comprising:
receiving, by an evolved NodeB to which a user equipment is attached, an S1-AP request message from an mobility management entity (MME), wherein the S1-AP request message comprises a location area identity, and wherein the location area identity comprises a public land mobile network (PLMN) identity for a circuit switching (CS) domain for a circuit switching fallback (CSFB) for the user equipment; and in response to receiving the S1-AP request message from the MME, selecting, by the evolved NodeB to which the user equipment is attached, a target cell of a packet switching handover of the user equipment according to the PLMN identity for the CS domain, wherein the selected target cell belongs to a PLMN that is identified by the PLMN identity comprised in the S1-AP request message.

2. The method according to claim 1, wherein receiving the S1-AP request message comprises receiving an initial context setup request message sent by the MME.

3. The method according to claim 1, wherein receiving the S1-AP request message comprises receiving a UE context modification request message sent by the MME.

4. The method according to claim 1, wherein a target network of the packet switching handover is a 3G or universal mobile telecommunication system territorial radio access network (UTRAN).

5. The method according to claim 1, wherein a target network of the packet switching handover is a 2G or GSM EDGE Radio Access Network (GERAN).

6. The method according to claim 1, wherein the PLMN identity in the S1-AP request message identifies a mobile switching center/visitor location register (MSC/VLR) selected by the MME during a combined attach process.

7. The method according to claim 1, wherein the PLMN identity in the S1-AP request message identifies a CS domain selected by the MME during a combined attach process.

8. An evolved NodeB, comprising:
a receiver that receives an S1-AP request message from an mobility management entity (MME), and acquires public land mobile network (PLMN) information about a circuit switching fallback (CSFB) for a user equipment that is attached to the evolved NodeB through the S1-AP request message, wherein the S1-AP request message comprises a location area identity and wherein the location area identity comprises a PLMN identity for a circuit switching (CS) domain; and a processor, that, in response to receiving the S1-AP request message from the MME, selects a target cell of a packet switching handover for the user equipment according to the PLMN identity for the CS domain, wherein the selected target cell belongs to a PLMN that is identified by the PLMN identity.

9. The evolved NodeB according to claim 8, wherein a target network of the packet switching handover is a 3G or UTRAN and wherein the processor is configured to determine the PLMN information about the CSFB from a target radio network controller (RNC) ID parameter.

10. The evolved NodeB according to claim 8, wherein the PLMN information about the CSFB comprises PLMN information about a mobile switching center/visitor location register (MSC/VLR) selected by the MME during a combined tracking area update process of the CSFB.

11. The evolved NodeB according to claim 8, wherein the PLMN information about the CSFB comprises PLMN information about a CS domain selected by the MME during a combined tracking area update process of the CSFB.

12. The evolved NodeB according to claim 8, wherein a target network of the packet switching handover is a 2G or GERAN and wherein the processor is configured to determine the PLMN information about the CSFB from a target cell global identification (CGI) parameter.

13. The evolved NodeB according to claim 8, wherein the S1-AP request message comprises an initial context setup request message or a UE context modification request message.

14. An evolved NodeB, comprising:
a non-transitory memory storage comprising instructions; and
one or more processors in communication with the non-transitory memory storage, wherein the one or more processors execute the instructions to:
receive an S1-AP request message from an mobility management entity (MME), and acquire public land mobile network (PLMN) information about a circuit switching fallback (CSFB) for a user equipment that is attached to the evolved NodeB through the S1-AP request message, wherein the S1-AP request message comprises a location area identity, wherein the location area identity comprises a PLMN identity for a circuit switching (CS) domain; and
in response to receiving the S1-AP request message from the MME, select a target cell of a packet switching handover of the user equipment according to the PLMN identity for the CS domain, wherein the selected target cell belongs to a PLMN that is identified by the PLMN identity comprised in the S1-AP request message.

15. The evolved NodeB according to claim 14, wherein the S1-AP request message comprises an initial context setup request message.

16. The evolved NodeB according to claim 14, wherein the S1-AP request message comprises a UE context modification request message.

17. The evolved NodeB according to claim 14, wherein the PLMN information about the CSFB comprises PLMN information about a mobile switching center/visitor location register (MSC/VLR) selected by the MME during a combined attach process.

18. The evolved NodeB according to claim 14, wherein the PLMN information about the CSFB comprises PLMN information about a CS domain selected by the MME during a combined attach process.

* * * * *